US009228088B2

(12) United States Patent
Brouwer et al.

(10) Patent No.: US 9,228,088 B2
(45) Date of Patent: Jan. 5, 2016

(54) COMPOSITION FOR THE ALKALINE PASSIVATION OF ZINC SURFACES

(75) Inventors: Jan-Willem Brouwer, Willich (DE); Jens Kroemer, Duesseldorf (DE); William E. Fristad, Rochester, MI (US); Annette Willer, Neuss (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 269 days.

(21) Appl. No.: 13/566,155

(22) Filed: Aug. 3, 2012

(65) Prior Publication Data
US 2013/0202800 A1 Aug. 8, 2013

Related U.S. Application Data

(63) Continuation of application No. PCT/EP2011/050526, filed on Jan. 17, 2011.

(30) Foreign Application Priority Data

Feb. 9, 2010 (DE) .......................... 10 2010 001 686

(51) Int. Cl.
*C23C 22/60* (2006.01)
*C23C 22/34* (2006.01)
*C23C 22/78* (2006.01)
*C23C 22/83* (2006.01)
*C09D 5/08* (2006.01)
*C23C 22/73* (2006.01)

(52) U.S. Cl.
CPC . *C09D 5/08* (2013.01); *C23C 22/34* (2013.01); *C23C 22/60* (2013.01); *C23C 22/73* (2013.01)

(58) Field of Classification Search
CPC .......... C09D 5/08; C23C 22/60; C23C 22/34; C23C 22/73; C23C 22/76; C23C 22/83
USPC ......... 106/14.12, 14.41, 14.44; 148/243, 253, 148/254, 259
See application file for complete search history.

(56) References Cited

U.S. PATENT DOCUMENTS

| | | | | |
|---|---|---|---|---|
| 3,181,976 | A * | 5/1965 | Yager | 148/259 |
| 3,444,007 | A * | 5/1969 | Maurer | 148/273 |
| 3,515,600 | A * | 6/1970 | Ellis | 148/261 |
| 3,620,949 | A | 11/1971 | Morrison et al. | |
| 4,163,679 | A * | 8/1979 | Nagae et al. | 148/272 |
| 4,511,513 | A | 4/1985 | Guth et al. | |
| 4,801,337 | A | 1/1989 | Higgins | |
| 4,888,386 | A | 12/1989 | Huang et al. | |
| 5,294,266 | A * | 3/1994 | Hauffe et al. | 148/247 |
| 5,792,283 | A | 8/1998 | Roland et al. | |
| 6,090,224 | A | 7/2000 | Wichelhaus et al. | |
| 6,197,126 | B1 | 3/2001 | Roland et al. | |
| 6,346,295 | B1 * | 2/2002 | Riesop et al. | 427/353 |
| 6,720,032 | B1 | 4/2004 | Kuhm et al. | |
| 7,709,435 | B2 * | 5/2010 | Hino et al. | 510/254 |
| 8,337,641 | B2 * | 12/2012 | Yamamoto et al. | 148/267 |
| 8,715,403 | B2 * | 5/2014 | Brouwer et al. | 106/1.22 |
| 2004/0112471 | A1 | 6/2004 | Moriya et al. | |
| 2013/0202797 | A1 | 8/2013 | Brouwer et al. | |
| 2013/0202800 | A1 | 8/2013 | Brouwer et al. | |

FOREIGN PATENT DOCUMENTS

| | | |
|---|---|---|
| DE | 2017327 A1 | 1/1971 |
| DE | 2317896 A1 | 11/1973 |
| DE | 3110822 A1 | 12/1981 |
| DE | 3208311 A1 | 12/1982 |
| DE | 4017186 A1 | 12/1991 |
| DE | 4341041 A1 | 6/1995 |
| DE | 19606017 A1 | 8/1997 |
| DE | 19705701 A1 | 8/1998 |
| DE | 19733972 A1 | 2/1999 |
| DE | 19834796 A1 | 2/2000 |
| DE | 102010001686 A1 | 8/2011 |
| DE | 102010030697 A1 | 1/2012 |
| EP | 0154384 A2 | 9/1985 |
| EP | 0240943 A2 | 10/1987 |
| EP | 0659906 A1 | 6/1995 |
| GB | 1042108 A | 9/1966 |

(Continued)

OTHER PUBLICATIONS

International Search Report PCT/EP2011/050526 dated Apr. 21, 2011 All references cited in the International Search Report are listed herein.
DIN EN ISO 2114, Copyright DIN Deutsches Institut fur Normung e.V., Germany, Jun. 2002.
DIN EN 988, Cinkarna Technische Daten, Titanzinkbleche. Metalursko Kemicna Industrija Celje, d.d., Slovenija.
VDA 621-415, Testing of Corrosion Protection of Vehicle Paint by Alternating Cycles Test. Copyright 2006, Ascott Analytical Equipment Ltd.
DIN EN ISO 20567-1, Paints and varnishes—Determination of stone-chip resistance of coatings, Part 1: Multi-impact testing, Edition Jan. 1, 2007. Copyright ON-2007. Published by ON Osterreichisches Normunginstitut.

(Continued)

Primary Examiner — Anthony J Green
(74) Attorney, Agent, or Firm — Mary K. Cameron

(57) ABSTRACT

The present invention relates to an aqueous alkaline composition (A) for alkaline passivation of metallic components comprising at least in part surfaces of zinc or zinc alloys, containing iron(III) ions, phosphate ions, and one or more complexing agents, where a free alkalinity ranges from 1 to 6 points, and the pH is at least 11. The aqueous compositions (A) can additionally contain nonionic surfactants, so that such compositions are suitable for use in a method in which both cleaning and alkaline passivation of the metallic component occur in one step. The present invention further relates to a method for alkaline passivation of metallic components by contacting them with composition (A), and further a method for surface treatment in automobile body production, in which the alkaline passivation step using composition (A) is followed by an acid passivation step using a composition (B).

20 Claims, No Drawings

(56) References Cited

FOREIGN PATENT DOCUMENTS

| WO | 9507370 | A1 | 3/1995 |
| WO | 9630559 | A1 | 10/1996 |
| WO | 0140546 | A1 | 6/2001 |
| WO | 2007065645 | A1 | 6/2007 |
| WO | 2009045845 | A2 | 4/2009 |

OTHER PUBLICATIONS

German Examination Report for DE 10 2010 001 688.1-45, issued Jan. 20, 2011. All references cited in the German Examination Report are listed herein.

International Search Report for co-pending application PCT/EP2012/053907 dated Jun. 15, 2012. All references cited in the International Search Report are listed herein, unless previously cited or unless an equivalent was cited.

* cited by examiner

COMPOSITION FOR THE ALKALINE PASSIVATION OF ZINC SURFACES

The present invention relates to an aqueous alkaline composition (A) for alkaline passivation of metallic components that at least in part comprise surfaces of zinc or zinc alloys, containing iron(III) ions, phosphate ions, and one or more complexing agents, a free alkalinity in the range from 1 to 6 points being established, and the pH being equal to at least 10.5. The aqueous compositions (A) according to the present invention can additionally contain nonionic surfactants, so that such compositions are suitable for utilization in a method in which both cleaning and alkaline passivation of the metallic component occur in one step. The present invention further relates to a method for alkaline passivation and optionally cleaning of metallic components that at least in part comprise surfaces of zinc or zinc alloys, by bringing them into contact with composition (A). The present invention encompasses in particular a method for surface treatment in automobile body production, in which method the alkaline passivation step using composition (A) is followed by an acid passivation step using a composition (B), with the result that as compared with passivating methods that omit an alkaline passivating step, an improvement in corrosion resistance and in adhesion to subsequently applied organic paint systems is achieved, especially on the zinc surfaces of the metallic component.

Corrosion protection agents that represent an acid aqueous solution of fluoro complexes have been known for some time, and substitute for the chromating methods for passivating pretreatment that have used for a long time in the existing art. Such corrosion protection agents, which produce only a thin conversion layer on the treated metal surfaces, are now also being discussed as a replacement for phosphating methods, and used in particular in the automotive supplier industry in order to replace the multi-step phosphating method, which is associated with high material turnover rates, with methods having a lower material turnover and less process-engineering complexity. Such solutions of fluoro complexes as a rule contain further corrosion-protective active substances that further improve the corrosion protection effect and paint adhesion.

WO 07/065,645, for example, describes aqueous compositions that contain fluoro complexes of, among others, titanium and/or zirconium, a further component additionally being contained that is selected from: nitrate ions, copper ions, silver ions, vanadium or vanadate ions, bismuth ions, magnesium ions, zinc ions, manganese ions, cobalt ions, nickel ions, tin ions, buffer systems for the pH range from 2.5 to 5.5, aromatic carboxylic acids having at least two groups that contain donor atoms, or derivatives of such carboxylic acids, silicic acid particles having an average particle size below 1 μm.

A demand exists for further advances in the corrosion-protective pretreatment of metal surfaces, and for introducing the performance features of a tri-cation zinc phosphating operation with regard to corrosion protection and paint adhesion. It is no longer merely the number of individual method steps that is critical for the success of a pretreatment in this context, but rather the performance of the coating especially in terms of the pretreatment of components that are composed of steel, galvanized steel, and aluminum as materials.

In particular, the problem often exists in the automotive industry that as a result of acid chromium-free passivating solutions known in the existing art, zinc surfaces fall considerably behind, as compared with steel surfaces, in terms of protection from corrosive infiltration of the paint layer. Improving the passivation layers on the zinc surfaces of an auto body assembled from different metals is therefore a prerequisite for the success of pretreatment methods constituting alternatives to phosphating.

The published application WO 2009045845 discloses an electroless metallizing pretreatment prior to a zirconium-based conversion treatment of metal surfaces, in particular of steel and galvanized steel. Before the conversion treatment, a pretreatment with an acid aqueous composition containing water-soluble salts of electropositive metals, selected from nickel, copper, silver, and/or gold, is performed. A composition of this kind for metallization can additionally contain defoamers and wetting agents. When poorly soluble copper salts are used, it is proposed in WO 2009045845 to use complexing agents to increase the concentration of copper ions in the metallizing composition. It is apparent that the metallization operation proposed in WO 2009045845, prior to a conversion treatment with an acid composition based on complex metal fluorides, does not exhibit the results in terms of paint adhesion and corrosion resistance that can be achieved by zinc phosphating.

The closest prior art to the present invention is considered to be the German application DE 19733972, which contains a method for alkaline passivating pretreatment of galvanized and alloy galvanized steel surfaces in strip facilities. Here the surface-treated steel strip is brought into contact with an alkaline treatment agent containing magnesium ions, iron (III) ions, and a complexing agent. At the indicated pH of more than 9.5, the zinc surface is thereby passivated as the corrosion protection layer forms. According to the teaching of DE 19733972, a surface passivated in this manner already offers paint adhesion that is comparable with nickel- and cobalt-containing methods. This pretreatment to improve corrosion protection can optionally be followed by further treatment steps, such as chromium-free post-passivation, before the paint system is applied. It is nevertheless apparent that this pretreatment system is not capable of satisfactorily suppressing the paint delamination brought about by corrosion at cut edges.

Proceeding from this existing art, the object arises of establishing an alkaline passivation operation that achieves a further improvement in the corrosion resistance of surfaces, made of zinc and/or alloys thereof, that are thereby pretreated and coated with an organic paint system, the intention being in particular to more vigorously suppress corrosive infiltration and delamination of the paint system on the zinc surfaces. At the same time, a corresponding alkaline passivation is intended to in a pretreatment process that provides for the cleaning, passivation, and coating, with an organic paint system, of metallic components that are made up at least in part of surfaces of zinc and/or alloys thereof.

This object is achieved by means of an aqueous alkaline composition (A) containing a) at least 50 ppm iron(III) ions,
b) at least 100 ppm phosphate ions,
c) at least 100 ppm of complexing agents selected from organic compounds c1) that comprise at least one functional group selected from —COOX, —OPO$_3$X, and/or —PO$_3$X, where X represents either a hydrogen atom or an alkali and/or alkaline-earth metal atom, and/or condensed phosphates c2) calculated as PO$_4$, the composition having a free alkalinity of at least 1 point but less than 6 points, and a pH of at least 10.5.

"Alkaline" is understood to mean that composition (A) has a pH in the range from 10.5 to 14, by preference in the range from 11.0 to 13.5. Below a pH of 10.5, surface coverages of at least 20 mg/m$^2$ of iron are not constituted on the zinc surfaces when they are brought into contact with a composition (A), so that alkaline passivation of zinc surfaces as defined by the present invention does not occur at such low pH values.

A parameter that is critical for the effectiveness of compositions (A) is free alkalinity. Free alkalinity is determined by titrating 2 ml of bath solution, by preference diluted to 50 ml, with a 0.1 n acid such as hydrochloric acid or sulfuric acid to a pH of 8.5. The quantity (in ml) of acid solution consumed indicates the number of free alkalinity points.

The term "condensed phosphates" in accordance with component c1) groups together, for purposes of the present invention, the metaphosphates ($Me_n[P_nO_{3n}]$), di-, tri-, and polyphosphates ($Me_{n+2}[P_nO_{3n+1}]$, or $Me_n[H_2P_nO_{3n+1}]$), the isometaphosphates, and crosslinked polyphosphates that are water-soluble at room temperature, Me being either alkali-metal or alkaline-earth-metal atoms. Instead of the water-soluble salts, it is of course also possible to use the corresponding condensed acids of phosphoric acid to formulate compositions (A) according to the present invention, provided the free alkalinity is adjusted as indicated. The mass-based proportion of the "condensed phosphates" according to component c2) in terms of composition (A) according to the present invention is always calculated as a corresponding quantity of $PO_4$. Analogously, for the determination of those molar ratios that encompass a quantity of condensed phosphates, that quantity of condensed phosphates is always referred to the equivalent quantity of $PO_4$.

It has been found that an aqueous alkaline composition (A) brings about a suitable passivation of zinc surfaces that represents a good adhesion base when, in particular, the free alkalinity is less than 5 points. This is also true especially for the application of composition (A) in a spray method, which produces suitable passivation in particular when the free alkalinity is less than 4 points. It has been found, surprisingly, that high surface coverages (above 150 mg/m$^2$) of iron on zinc surfaces behave rather disadvantageously in terms of adhesion to organic paint coatings, so that compositions (A) according to the present invention must not have an excessively high free alkalinity. The free alkalinity should, however, by preference be equal to at least 2 points so that a sufficient surface coverage of at least 20 mg/m$^2$ based on elemental iron can be produced on zinc surfaces. Compositions (A) that exhibit a free alkalinity above 6 points do result in high surface coverages of iron on the zinc surfaces, but adhesion to subsequently applied paint layers is considerably decreased by high surface coverages based on elemental iron, so that corrosion protection is also less effective resp. insufficient.

The proportion of iron(III) ions in the composition is by preference equal to no more than 2000 ppm. Higher proportions of iron(III) ions are unfavorable in terms of process management, since the solubility of the iron(III) ions in the alkaline medium must be maintained by means of correspondingly high proportions of complexing agents, but more-favorable properties in terms of passivation of the zinc surfaces are not thereby attained. Those compositions (A) in which the proportion of iron(III) ions is equal to at least 100 ppm, particularly preferably at least 200 ppm are preferred, however, in order to obtain effective passivating inorganic layers on the zinc surfaces, which form completely within process-typical treatment times of less than two minutes.

The complexing agents in accordance with component c) of the alkaline composition (A) according to the present invention are by preference contained in a quantity such that the molar ratio of all components c) to iron(III) ions is greater than 1:1, and particularly preferably is at least 2:1, especially preferably at least 5. It is apparent that utilization of the quantity of complexing agents at stoichiometric excess is advantageous in terms of process management, since the proportion of iron(III) ions can thereby be kept permanently in solution. Precipitation of insoluble iron hydroxides is thereby completely suppressed, so that composition (A) remains permanently stable and is not depleted of iron(III) ions. At the same time, however, sufficient deposition of an inorganic layer containing iron ions onto the zinc surfaces takes place. An excess of complexing agents thus does not suppress the precipitation and deposition of insoluble iron salts in a reaction zone directly at the zinc surface, in which alkalinity is elevated because of the pickling attack of composition (A). For reasons of cost-effectiveness and in the interest of resource-conserving utilization of the complexing agents, however, it is preferred that the molar ratio of components c) to iron(III) ions in the composition not exceed a value of 10.

The phosphate ions contained in composition (A) according to the present invention are, alongside the iron ions, an essential constituent of the passivation layer that forms on a zinc surface after composition (A) is brought into contact therewith. For the formation of passive layers on zinc surfaces that are advantageous for further passivation and moreover impart good adhesion to subsequently applied paint layers, it is preferred that compositions according to the present invention preferably contain at least 200 ppm, particularly preferably at least 500 ppm phosphate ions. The properties of the passive layers that form when a zinc surface is brought into contact with compositions (A) according to the present invention are no longer positively influenced above a 4 g/kg proportion of phosphate ions, so that for reasons of cost-effectiveness the proportion of phosphate ions in composition (A) should preferably be below 10 g/kg.

The ratio of iron(III) ions to phosphate ions can be varied over a wide range, provided the minimum quantities of both components in composition (A) are maintained. The mass-based ratio of iron(III) ions to phosphate ions in a composition according to the present invention is by preference in a range from 1:20 to 1:2, particularly preferably in a range from 1:10 to 1:3. Compositions (A) according to the present invention that exhibit such a mass ratio of components a) to b) provide, after they are brought into contact with a zinc surface, homogeneous gray-black passive layers containing phosphate ions having surface coverages of 20 to 150 mg/m$^2$ based on elemental iron.

Condensed phosphates are capable of holding iron(III) ions in solution in an alkaline medium by complexing. Although no particular limitations exist regarding the nature of the condensed phosphates, in terms of their usability for composition (A) according to the present invention, those condensed phosphates that are selected from pyrophosphates, tripolyphosphates, and/or polyphosphates, particularly preferably from pyrophosphates, are preferred, since they are particularly readily water-soluble and are very easily accessible.

Preferred organic compounds c1) that are contained alongside or alternatively to the condensed phosphates as complexing agents in composition (A) are those compounds that have in their acid form (X=hydrogen atom) an acid number of at least 250. Lower acid numbers impart surface-active properties to the organic compounds, so that organic compounds c1) having acid numbers below 250 can act as strongly emulsifying anionic surfactants. The emulsifying effect can be sufficiently pronounced that contaminants in the form of oils and drawing grease, carried over out of the cleaning step via the metallic component, can be removed from the alkaline passivating step only by means of laborious separation processes, for example by an addition of cationic surfactants, so that further process parameters need to be controlled. It is therefore more advantageous to adjust the alkaline passivating step, and thus composition (A), to be only slight emulsifying, in order to enable conventional removal of the floating oils and greases. Anionic surfactants moreover tend toward pronounced foaming, which is particularly disadvantageous e.g. in the context of spray application of composition (A). Organic complexing agents c1) having acid numbers of at least 250 are therefore preferably used in the composition according to the present invention, the acid number indicating the quantity (in milligrams) of potassium hydroxide required, per DIN EN ISO 2114, to neutralize 1 g of the organic compound c1) in 100 g of water.

Preferred organic complexing agents c1) in composition (A) according to the present invention are selected from α-, β-, and/or γ-hydroxycarboxylic acids, hydroxyethane-1,1-diphosphonic acid, [(2-hydroxyethyl)(phosphonomethyl) amino]methylphosphonic acid, diethylenetriamine pentakis (methylenephosphonic acid), and/or amino-tris-(methylenephosphonic acid), as well as salts thereof.

The present invention thus explicitly encompasses those compositions (A) that contain exclusively condensed phosphates c2), exclusively organic complexing agents c1), or a mixture of both. The proportion of organic complexing agent c1) in composition (A) can, however, be reduced to the extent to which complexing agent c2), selected from condensed phosphates, is contained. In a particular embodiment of composition (A), complexing agents c2) selected from condensed phosphates, and organic complexing agents c1), are therefore contained, the molar ratio of all components c) to iron(III) irons being greater than 1:1, but the molar ratio of components c1) to iron(III) ions being greater than 1:1, particularly preferably less than 3:4, but by preference being at least 1:5. A mixture of the two complexing agents c1) and c2) is advantageous because the condensed phosphates are in equilibrium with the phosphate ions of composition (A) in the alkaline medium at elevated temperature, so that phosphate ions consumed by layer formation are slowly made up from the condensed phosphate ions. Conversely, however, the presence of condensed phosphates alone is not sufficient to produce on the zinc surfaces an alkaline passivation layer containing iron and phosphate, so that the proportion of phosphate ions in composition (A) is obligatory. In the presence of the condensed phosphates, however, the precipitation especially of poorly soluble phosphates, for example iron phosphates, is suppressed even at high pH values (above 10) by interaction with the organic complexing agents c2), so that compositions (A) that contain a mixture of the complexing agents are preferred according to the present invention; care should preferably be taken that the molar ratio of components c1) to iron (III) ions is equal to at least 1:5.

In order to enhance cleaning capability for the metal surfaces to be treated, the composition according to the present invention can additionally contain nonionic surfactants. This additional cleaning and activation of the metal surfaces by means of compositions (A) containing nonionic surfactants produces the advantage that passive-layer formation on the zinc surfaces occurs more homogeneously as compared with compositions (A) according to the present invention that do not contain nonionic surfactants as surface-active substances. Passivation produced homogeneously on the zinc surfaces of the metallic component is a basic prerequisite for similarly homogeneous adhesion of organic paint systems that are subsequently applied onto the metallic component. The nonionic surfactants are preferably selected from one or more ethoxylated and/or propoxylated C10 to C18 fatty alcohols having in total at least two but no more than 12 alkoxy groups, particularly preferably ethoxy and/or propoxy groups, which can be present in part end-capped with an alkyl residue, particularly preferably with a methyl, ethyl, propyl, butyl residue. For sufficient cleaning and activation of the metal surfaces, the concentration of nonionic surfactants in a composition (A) according to the present invention is by preference at least 10 ppm, particularly preferably at least 100 ppm; for reasons of cost-effectiveness, by preference no more than 10 g/kg of nonionic surfactants are contained. The use of highly emulsifying anionic surfactants in composition (A) according to the present invention should be avoided for the reasons already explained earlier, so that their concentration in compositions (A) is by preference no greater than 500 ppm, particularly preferably no greater than 100 ppm.

A further advantage of the present invention is the fact that additions of heavy-metal ions, which are used in conventional alkaline compositions for the passivation of zinc surfaces, can be entirely omitted, so that composition (A) according to the present invention by preference contains no heavy metals selected from nickel, cobalt, manganese, molybdenum, chromium, and/or cerium. The presence of small quantities of these heavy metals in composition (A) according to the present invention that is used in a passivating step in the context of operation of a pretreatment line cannot, however, be entirely avoided. For example, nickel and manganese are usual alloy constituents of steel which, in the context of treatment with composition (A), can make their way into the passivating step by partial dissolution of natural oxide layers. Composition (A) according to the present invention therefore by preference contains less than a total of 10 ppm of ionic compounds of the metals nickel, cobalt, manganese, molybdenum, chromium, and/or cerium, in particular less than 1 ppm of ionic compounds of the metals nickel and/or cobalt.

Surface pickling of the zinc surfaces of the metallic component during alkaline passivation of the method according to the present invention causes zinc ions to travel into the aqueous composition (A). The same also applies to aluminum ions, if the metallic components being treated also comprise surfaces made of aluminum alongside the zinc surfaces. Metal cations of the elements zinc and aluminum do not, however, exert any negative influence on the effectiveness of the compositions (A) and are therefore tolerable.

A particular embodiment of composition (A) according to the present invention contains
a) 0.05 to 2 g/kg iron(III) ions,
b) 0.1 to 4 g/kg phosphate ions,
c) at least 0.1 g/kg of complexing agents selected from organic compounds c1) that comprise at least one functional group selected from —COOX, —OPO$_3$X, and/or —PO$_3$X, where X represents either a hydrogen atom or an alkali and/or alkaline-earth metal atom, and/or condensed phosphates c2) calculated as PO$_4$,
d) in total 0.01 to 10 g/kg of nonionic surfactants,
e) in total less than 10 ppm of ionic compounds of the metals nickel, cobalt, manganese, molybdenum, chromium, and/ or cerium, in particular less than 1 ppm of ionic compounds of the metals nickel and/or cobalt,
no more than 10 g/l of condensed phosphates c2) calculated as PO$_4$ being contained, and the molar ratio of the sum of components c1) and c2) to iron(III) ions being greater than 1:1, and the free alkalinity being less than 6 points and the pH being at least 10.5.

The invention encompasses in particular those compositions (A) that have the following composition:
a) 0.05 to 2 g/kg iron(III) ions,
b) 0.1 to 4 g/kg phosphate ions, c) at least 0.1 g/kg of complexing agents selected from organic compounds c1) that comprise at least one functional group selected from —COOX, —OPO$_3$X, and/or —PO$_3$X, where X represents either a hydrogen atom or an alkali and/or alkaline-earth metal atom, and/or condensed phosphates c2) calculated as PO$_4$,
d) in total 0.01 to 10 g/kg of nonionic surfactants,
e) in total less than 10 ppm of ionic compounds of the metals nickel, cobalt, manganese, molybdenum, chromium, and/or cerium, in particular less than 1 ppm of ionic compounds of the metals nickel and/or cobalt,
f) in total less than 0.1 g/kg of organic polymeric constituents,
g) quantities of counter-ions equivalent to the components a), b), and e),
h) remainder: water having a hardness of no more than 30° German hardness,
no more than 10 g/l of condensed phosphates c2) calculated as PO$_4$ being contained, and the molar ratio of the sum of components c1) and c2) to iron(III) ions being greater than 1:1, and the free alkalinity being less than 6 points and the pH being at least 10.5.

The present invention likewise encompasses a method for alkaline passivation of metallic components that comprise at least in part surfaces of zinc, the metallic component being brought into contact with an alkaline aqueous composition (A) according to the present invention.

In a preferred embodiment of the method, the metallic component is brought into contact for at least 30 seconds but not more than 4 minutes, at a temperature of at least 30° C., particularly preferably at least 40° C., but no more than 70° C., particularly preferably no more than 60° C., with an alkaline aqueous composition (A). As already discussed, compositions (A) according to the present invention bring about passivation of the zinc surfaces. Formation of the passive layer occurs, in this context, in self-limiting fashion, i.e. specific maximum surface coverages can be implemented depending on the specific formulation of composition (A). The preferred treatment times resp. contact times in the method according to the present invention should be selected so that the surface coverage of iron is at least 20 mg/m$^2$. The treatment and contact times for implementing a minimum surface coverage of this kind vary depending on the manner of application, and depend in particular on the flow of aqueous fluid acting on the metal surface to be treated. For example, formation of the passivation system occurs more quickly in methods in which the composition is applied by spraying than in dip applications. Regardless of the manner of application, surface coverages of iron much above 200 mg/m$^2$ are not achieved with the compositions (A) according to the present invention, because the passive layer buildup is self-limiting.

For sufficient layer formation and optimum adhesion-promoting properties of the passive layers on the zinc surfaces that as a result of bringing the compositions (A) according to the present invention into contact with a metallic component that comprises at least in part surfaces of zinc, surface coverages of iron of at least 20 mg/m$^2$ but no more than 150 mg/m$^2$ should exist immediately after alkaline passivation with or without a subsequent rinsing step.

The method according to the present invention is of technical importance in particular in the pretreatment of automobile bodies, since alkaline passivation can follow alkaline cleaning of the body immediately, i.e. without an interposed rinsing step. If composition (A) according to the present invention additionally contains nonionic surfactants, alkaline cleaning of the body and alkaline passivation of the zinc surfaces can then occur in one step. A separation of the alkaline cleaning step and alkaline passivation step by a rinsing step is thus just as unnecessary as performing cleaning and alkaline passivation in two method steps and different baths.

A method according to the present invention is correspondingly notable in particular at least for the fact that the metallic component that comprises at least in part surfaces of zinc is firstly brought into contact with an alkaline cleaner in a cleaning and degreasing bath, the alkaline cleaner having by preference a pH in the range from 9 to 14, with no rinsing step occurring before it is subsequently brought into contact with the alkaline aqueous composition (A).

In the method according to the present invention, as has already been discussed, an inorganic passivating layer containing iron and phosphate is generated on the zinc surfaces, while no deposition of an inorganic layer of this kind could be detected on the other surfaces of the metallic component, which can be e.g. surfaces of iron, steel, and/or aluminum. The specific deposition of the passive layer on the zinc surfaces results, surprisingly, in a distinct improvement in the corrosion-protection properties of those surfaces when an acid passivation of the entire metallic component is additionally performed. An acid passivation of this kind is a usual action in the automotive industry for pretreatment prior to formation of an organic paint coating, which begins in standard fashion with dip coating of the pretreated body. The method according to the present invention is thus particularly advantageous when the alkaline passivation is followed, in a further method step, by an acid passivation with an interposed rinsing step, the acid passivation being carried out by bringing the metallic component into contact with an acid aqueous composition (B) that contains in total at least 5 ppm, but in total no more than 1500 ppm of water-soluble inorganic compounds of the elements zirconium, titanium, and/or hafnium, based on the aforesaid elements, and by preference also those water-soluble inorganic compounds that release fluoride ions.

The alkaline composition (B) for acid passivation in the previously described preferred method according to the present invention is by preference chromium-free, i.e. it contains less than 10 ppm, by preference less than 1 ppm chromium, in particular no chromium(VI). Further preferred in the method according to the present invention are those acid aqueous compositions (B) that contain, as water-soluble compounds of the elements zirconium, titanium, and/or hafnium, only water-soluble compounds of the elements zirconium and/or titanium, particularly preferably water-soluble components of the element zirconium. Preferred water-soluble compounds of the elements zirconium and/or titanium are compounds that, in aqueous solution, dissociate into anions of fluoro complexes of the elements titanium and/or zirconium. Such preferred compounds are, for example, $H_2ZrF_6$, $K_2ZrF_6$, $Na_2ZrF_6$, and $(NH_4)_2ZrF_6$, and the analogous titanium compounds. Fluorine-free compounds of the elements titanium and/or zirconium can also be used according to the present invention as water-soluble compounds, for example $(NH_4)_2Zr(OH)_2(CO_3)_2$ or $TiO(SO_4)$. In a method according to the present invention the acid aqueous composition (B) preferably contains, as water-soluble inorganic compounds that dissociate into copper ions, in particular at least 1 ppm, but no more than 50 ppm, copper ions.

EXEMPLIFYING EMBODIMENTS

Individual method steps in a spray facility for pretreating galvanized steel panels (HDG: Gardobond® EA; ZE: Gardobond® MBZE5; Chemetall Co.):

A. Alkaline cleaning (pH 11):
3 wt % Ridoline® 1574A (Henkel Co.); 0.4 wt % Ridosol® 1270 (Henkel Co.), containing $H_3PO_4$, $K_4P_2O_7$, sodium gluconate, sodium salt of hydroxyethane-1,1-diphosphonic acid, KOH Treatment time at 60° C. and 1 bar spray pressure: 120 seconds.

B. Rinse with deionized water (<1 µS cm$^{-1}$)

C. Alkaline passivation:
Composition (A) made up of
1.09 wt % KOH
0.19 wt % $H_3PO_4$
0.22 wt % $K_4P_2O_7$
0.06 wt % sodium gluconate
0.04 wt % sodium salt of hydroxyethane-1,1-diphosphonic acid
0.23 wt % $Fe(NO_3)_3.9H_2O$
Remainder deionized water (<1 µS cm$^{-1}$)
pH: 13
Free alkalinity: 2 points
Treatment time at 55° C. and 1 bar spray pressure: 60 seconds D. Acid passivation:
Composition (B) made up of
0.35 g/l $H_2ZrF_6$
0.12 g/l ammonium bifluoride
39 ppm $Cu(NO_3)_2.3H_2O$
Remainder deionized water (<1 µS cm$^{-1}$)
pH: 4
Treatment time at 30° C. and 1 bar spray pressure: 120 seconds E. Paint:
Cathoguard® 500 (BASF Co.); layer thickness: 20 to 22 µm.

The influence of pH on the formation of a passivating layer on zinc surfaces by bringing them into contact with compositions (A) is reproduced in Table 1, showing clearly that sufficient surface coverages of iron are achieved only above a pH of 11.

TABLE 1

Influence of pH on layer formation on zinc panels (titanium zinc panels per DIN EN 988: 99.995 atomic % Zn; Cinkarna Co.) during alkaline passivation with compositions according to a method sequence A-B-C, where the pH of the compositions in step C was adjusted with sodium hydroxide in the presence of a $NaHCO_3/Na_2CO_3$ buffer system:

|  | pH | | |
| --- | --- | --- | --- |
|  | 10.4 | 11.2 | 12.0 |
| Free alkalinity | 2.6 | 5.0 | 5.0 |
| Surface coverage*, iron (mg/m$^2$) | — | 18 | 30 |
| Spot test** on phosphate | negative | negative | positive |

*Measured with Niton ® XL3t 900 X-ray fluorescence analyzer (Thermo Fisher Scientific)
**Spot test with vanadate-molybdate reagent: yellow color = "positive"

Table 2 shows the influence of alkaline passivation in a method according to the present invention (method sequence A-C-B-D-B-E) on corrosive infiltration beneath the cathodic dip coating on galvanized steel strip, and results in the stone impact test. The corrosion values and paint adhesion values achieved with the method according to the present invention are clearly improved as compared with a method that provides only alkaline cleaning as a pretreatment prior to acid passivation and subsequent dip coating (method sequence A-B-D-B-E).

TABLE 2

Various method sequences for corrosion-protective pretreatment of galvanized steel strip

|  | Method sequence | U/2* (mm) | K value** | Surface coverage, iron (mg/m$^2$) |
| --- | --- | --- | --- | --- |
| HDG | A-B-D-B-E | 4.3 | 5.0 | — |
|  | A-C$^1$-B-D-B-E | 3.5 | 4.6 | 218 |
|  | A-C$^2$-B-D-B-E | 3.2 | 3.7 | 55 |
|  | A-C-B-D-B-E | 2.8 | 3.0 | 64 |
| ZE | A-B-D-B-E | 3.3 | 4.6 | — |
|  | A-C$^1$-B-D-B-E | 3.0 | 4.0 | 218 |
|  | A-C$^2$-B-D-B-E | 2.7 | 3.4 | 55 |
|  | A-C-B-D-B-E | 2.3 | 2.7 | 64 |

$^1$Free alkalinity: 8 points
$^2$Without $H_3PO_4$, $K_4P_2O_7$, sodium salt of hydroxyethane-1,1-diphosphonic acid; sodium gluconate: 0.25 wt %; free alkalinity: 2.5 points
*Infiltration at crack, after 10 rounds of VDA 621-415 alternating climate test
**DIN ISO 20567-1 stone impact test, after 10 rounds of VDA 621-415 alternating climate test
*** Measured with Niton ® XL3t 900 X-ray fluorescence analyzer (Thermo Fisher Scientific Co.) on zinc titanium panels per DIN EN 988.

When alkaline passivation occurs at a high free alkalinity (A-C$^1$-B-D-B-E method sequence), the surface coverage of iron on the zinc surfaces is elevated, but paint adhesion according to the stone impact test, in particular, is degraded. The degradation in terms of paint adhesion properties is already significant at a free alkalinity of 6 points. A method sequence A-C$^2$-B-D-B-E, which differs from a method according to the present invention only in that a composition that contains no phosphate and no pyrophosphate is used in the alkaline passivating step, exhibits (despite sufficient surface coverage of iron) a level of corrosion protection that is poorer as compared with the method according to the present invention.

The invention claimed is:

1. An aqueous alkaline composition (A) containing
   a) at least 50 ppm iron(III) ions,
   b) 0.1 to 4 g/kg $PO_4^{3-}$ ions,
   c) at least 100 ppm of complexing agents selected from the group consisting of:
      organic compounds c1) that comprise at least one functional group selected from the group consisting of —COOX, —OPO$_3$X, and —PO$_3$X, where X represents a hydrogen atom, an alkali-metal atom, or an alkaline-earth metal atom, condensed phosphates c2) calculated as $PO_4$, and
      mixtures thereof;
   the composition having a free alkalinity of at least 1 point but less than 6 points, and a pH of at least 10.5.

2. The composition (A) according to claim 1, wherein said composition has a free alkalinity of less than 5 points.

3. The composition (A) according to claim 1, comprising at least 100 ppm but no more than 2000 ppm iron(III) ions.

4. The composition (A) according to claim 1, having a mass-based ratio of iron(III) ions to $PO_4^{3-}$ ions in a range from 1:20 to 1:2.

5. The composition (A) according claim 1, having a molar ratio of all components c) to iron(III) ions that is at least 2:1.

6. The composition (A) according to claim 1, wherein component c) comprises condensed phosphates c2).

7. The composition (A) according to claim 6, wherein component c) comprises organic compounds c1).

8. The composition (A) according to claim 7, wherein the organic compounds c1) are selected from the group consisting of α-hydroxycarboxylic acids, β-hydroxycarboxylic acids, γ-hydroxycarboxylic acids, hydroxyethane-1,1-diphosphonic acid, [(2-hydroxyethyl) (phosphonomethyl) amino]methylphosphonic acid, diethylenetriamine pentakis (methylenephosphonic acid), amino-tris-(methylenephosphonic acid), salts of said acids and mixtures thereof, and composition (A) having a molar ratio of components c1) to iron(III) ions of less than 1:1, but at least 1:5.

9. The composition (A) according to claim 1, wherein the composition contains less than in total 10 ppm of ionic compounds of nickel, cobalt, manganese, molybdenum, chromium, and/or cerium.

10. The composition (A) according to claim 6, wherein the condensed phosphates c2) are selected from the group consisting of, pyrophosphates, tripolyphosphates, metaphosphates, isometaphosphates, polyphosphates, crosslinked polyphosphates and mixtures thereof.

11. The composition (A) according to claim 1, further comprising nonionic surfactants comprising one or more ethoxylated and/or propoxylated C10 to C18 fatty alcohols having in total at least two but no more than 12 alkyoxy groups.

12. The composition (A) according to claim 11, wherein one or more of the ethoxylated and/or propoxylated $C_{10}$ to $C_{18}$ fatty alcohols is present in part end-capped with an alkyl residue.

13. An aqueous alkaline composition (A) containing:
a) at least 50 ppm iron(III) ions,
b) at least 100 ppm $PO_4^{3-}$ ions,
c) at least 100 ppm of complexing agents selected from the group consisting of:
organic compounds c1) that comprise at least one functional group selected from the group consisting of —COOX, —OPO$_3$X, and —PO$_3$X, where X represents a hydrogen atom, an alkali-metal atom, or an alkaline-earth metal atom, condensed phosphates c2) calculated as PO$_4$, and
mixtures thereof; and
further comprising nonionic surfactants comprising one or more ethoxylated and/or propoxylated $C_{10}$ to C18 fatty alcohols having in total at least two but no more than 12 alkyoxy groups, the composition having a free alkalinity of at least 1 point but less than 6 points, and a pH of at least 10.5.

14. The composition (A) according to claim 13, wherein one or more of the ethoxylated and/or propoxylated $C_{10}$ to $C_{18}$ fatty alcohols is present in part end-capped with an alkyl residue.

15. The composition (A) according to claim 13, comprising at least 100 ppm but no more than 2000 ppm iron(III) ions; and having a molar ratio of all components c) to iron(III) ions that is at least 2:1.

16. The composition (A) according to claim 13, having a mass-based ratio of iron(III) ions to $PO_4^{3-}$ ions in a range from 1:20 to 1:2.

17. The composition (A) according to claim 13, wherein component c) comprises organic compounds c1) and condensed phosphates c2).

18. The composition (A) according to claim 13, wherein the composition contains less than in total 10 ppm of ionic compounds of nickel, cobalt, manganese, molybdenum, chromium, and/or cerium.

19. An aqueous alkaline composition (A) comprising:
a) 0.05 to 2 g/kg iron(III) ions,
b) 0.1 to 4 g/kg $PO_4^{3-}$ ions,
c) at least 0.1 g/kg of complexing agents selected from the group consisting of:
organic compounds c1) that comprise at least one functional group selected from the group consisting of —COOX, —OPO$_3$X, and —PO$_3$X, where X represents a hydrogen atom, an alkali metal atom or an alkaline-earth metal atom, and condensed phosphates c2) calculated as PO$_4$, and
mixtures thereof;
d) in total 0.01 to 10 g/kg of nonionic surfactants,
e) in total less than 10 ppm of ionic compounds of nickel, cobalt, manganese, molybdenum, chromium, and/or cerium,
the composition having a free alkalinity of at least 1 point but less than 6 points, a pH of at least 10.5, and wherein the composition comprises no more than 10 g/l of condensed phosphates c2) calculated as PO$_4$, and has a molar ratio of total moles of components c1) and c2) to moles of iron(III) ions of greater than 1:1.

20. The composition (A) according to claim 19, further comprising:
f) in total less than 0.1 g/kg of organic polymeric constituents,
wherein the composition comprises less than 1 ppm of ionic compounds of nickel and/or cobalt.

* * * * *